United States Patent
Raffle et al.

(10) Patent No.: US 9,137,229 B2
(45) Date of Patent: Sep. 15, 2015

(54) METHOD AND APPARATUS FOR A MULTI-PARTY CAPTCHA

(75) Inventors: Hayes Raffle, Palo Alto, CA (US); Cynthia Kuo, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/982,379

(22) PCT Filed: Feb. 1, 2011

(86) PCT No.: PCT/US2011/023357
§ 371 (c)(1),
(2), (4) Date: Jul. 29, 2013

(87) PCT Pub. No.: WO2012/105962
PCT Pub. Date: Aug. 9, 2012

(65) Prior Publication Data
US 2013/0312070 A1 Nov. 21, 2013

(51) Int. Cl.
*H04L 29/06* (2006.01)
*A63F 13/30* (2014.01)
*G06F 21/36* (2013.01)

(52) U.S. Cl.
CPC ............... *H04L 63/08* (2013.01); *A63F 13/12* (2013.01); *G06F 21/36* (2013.01); *A63F 2300/407* (2013.01); *A63F 2300/532* (2013.01); *A63F 2300/5566* (2013.01); *A63F 2300/572* (2013.01)

(58) Field of Classification Search
CPC ......... H04L 63/10; H04L 9/32; H04L 9/3271; G06F 2221/2133
See application file for complete search history.

(56) References Cited

U.S. PATENT DOCUMENTS

| 8,392,986 B1 * | 3/2013 | Gossweiler, III | 726/19 |
| 2004/0224772 A1 | 11/2004 | Canessa et al. | |
| 2008/0263636 A1 | 10/2008 | Gusler et al. | |
| 2010/0037147 A1 | 2/2010 | Champion et al. | |
| 2010/0106671 A1 * | 4/2010 | Li et al. | 706/46 |
| 2010/0251388 A1 * | 9/2010 | Dorfman | 726/29 |

FOREIGN PATENT DOCUMENTS

| CN | 1551030 A | 12/2004 |
| GB | 2405354 A | 3/2005 |
| TW | 200904101 A | 1/2009 |
| WO | WO-2008/091675 A1 | 7/2008 |

OTHER PUBLICATIONS

International Search Report and Written Opinion received in corresponding Patent Cooperation Treaty Application No. PCT/US2011/023357. Dated Apr. 1, 2011. 9 pages.

* cited by examiner

*Primary Examiner* — Izunna Okeke
(74) *Attorney, Agent, or Firm* — Harrington & Smith

(57) ABSTRACT

In accordance with an example embodiment of the present invention, a method comprising: receiving at least one request for generating a challenge from at least one device; generating the challenge with at least two components; transmitting component of the challenge to the at least one device; causing presentation of at least part of the challenge to at least two users; causing communication between said at least two users; and receiving at least two responses to the challenge from the at least one device. Related apparatus and computer program product are also described.

18 Claims, 4 Drawing Sheets

METHOD AND APPARATUS FOR A MULTI-PARTY CAPTCHA

RELATED APPLICATION

This application was originally filed as PCT Application No. PCT/US2011/023357 filed Feb. 1, 2011.

TECHNICAL FIELD

The present application relates generally to internet security.

BACKGROUND

Automated software programs or bots, short for robots, are problematic for many internet services. For example, bots can be used to automatically sign up email addresses so that the addresses can be used for spam or other fraud, or to automatically purchase large blocks of tickets for concerts or shows so that the tickets can be resold at a higher price.

To distinguish software bots from human users, many internet services rely on completely automated public turing tests to tell computers and humans apart, CAPTCHAs. In an example embodiment, a CAPTCHA is a test that most humans can easily pass and that current computer programs should fail. For example, online webmail services may display CAPTCHAs after a few failed login attempts. A valid human user will be able to complete the CAPTCHA and attempt to log in again. A software bot should not be able to continue trying to break the user's password.

SUMMARY

Various aspects of examples of the invention are set out in the claims.

According to a first aspect of the present invention, a method comprising: receiving at least one request for generating a challenge from at least one device; generating the challenge with at least two components; transmitting component of the challenge to the at least one device; causing presentation of at least part of the challenge to at least two users; causing communication between said at least two users; and receiving at least two responses to the challenge from the at least one device.

According to a second aspect of the present invention, an apparatus comprising: at least one processor; and at least one memory including computer program code; the at least one memory and the computer program code configured to, with the at least one processor, cause the apparatus to perform at least the following: receive at least one request for generating a challenge from at least one device; generate the challenge with at least two components; transmit component of the challenge to the at least one device; cause presentation of at least part of the challenge to at least two users; cause communication between said at least two users; and receive at least two responses to the challenge from the at least one device.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

For a more complete understanding of example embodiments of the present invention, reference is now made to the following descriptions taken in connection with the accompanying drawings in which:

FIG. 5 depicts an example approach of split phrase based on multi-party karaoke in accordance with an example embodiment of the invention.

DETAILED DESCRIPTION

An example embodiment of the present invention and its potential advantages are understood by referring to FIG. 1 through FIG. 6 of the drawings.

Figure 1:
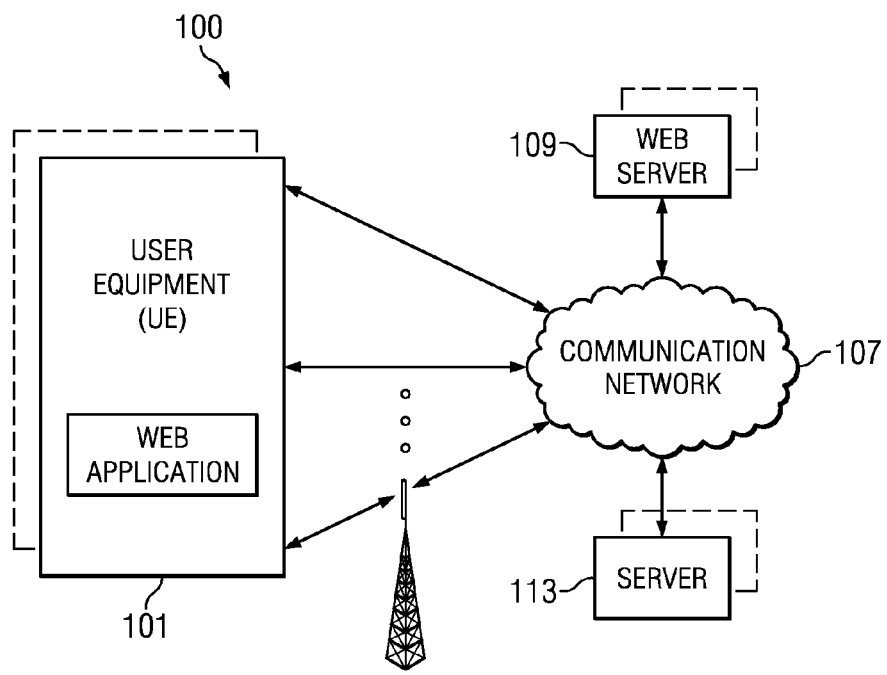
FIG. 1 depicts an example system capable of verifying that a user is human in accordance with an example embodiment of the invention.

FIG. 1 depicts an example system 100 capable of verifying that a user is human in accordance with an example embodiment of the invention. System 100 comprises a communication network 107, one or more user equipments 101, one or more web servers 109, and one or more server 113. A user runs a web application on a user equipment 101. Web server 109 is a device that runs a web site to provide internet service. The user equipment 101 request a service (e.g., buying tickets) from a third-party web server 109 (e.g., Ticketmaster), and the web server 109 sends a request for a challenge to the server 113. The server 113 sends a challenge back to the web server 109, who forwards it to the user equipment 101 to be presented to the user.

In an example embodiment, the challenge may be a textual image for the user to evaluate the characters inside the textual image. The internet service providers for the user equipment 101 and the web server 109 are relaying the traffic between the web server 109, the server 113 and the user equipment 101 through the communication network 107. Communication network 107 provides access for web server 109 and user equipment 101 running the web application in the user equipment 101. The web server 109 that uses completely automated public turing tests to tell computers and humans apart, CAPTCHAs, to distinguish software bots from human users generally licenses the service from server 113. Server 113 may be a third-party server. Furthermore, server 113 may be a CAPTCHA server.

Web server 109 retrieves the challenge from a third-party server 113. In an example embodiment, server 113 is a system that supplies web server 109 with images of words that optical character recognition, OCR, software has been unable to read. When the user enters a string on the user equipment 101, web server 109 sends the answer to the server 113. Server 113 evaluates whether the answer is correct or not, and sends the response back to the web server 109.

Figure 2:
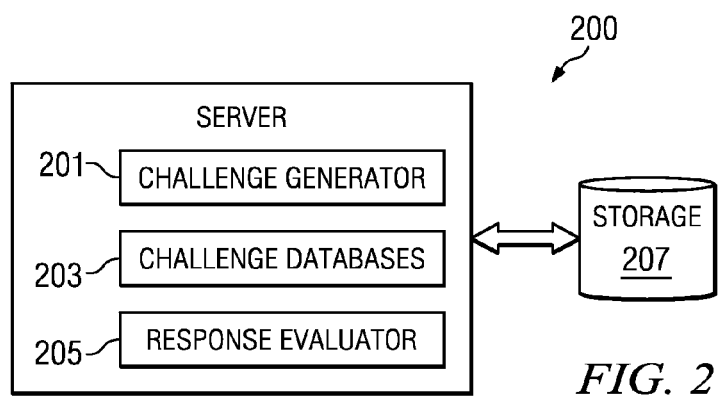
FIG. 2 depicts example components of a server in accordance with an example embodiment of the invention.

FIG. 2 depicts example components of a server in accordance with an example embodiment of the invention. The server 200, may be similar to server 113 of FIG. 1, includes one or more components for verifying that a user is human. The functions of these components may be combined in one or more components or performed by other components of equivalent functionality. In one embodiment, the server 200 includes, at least, a challenge generator 201, one or more challenge databases 203, one or more storage 207 and a response evaluator 205.

The challenge generator 201 generates one or more challenges while utilizing at least one or more databases 203. The challenge generator 201 then communicates the challenges to the one or more user equipments 101. Furthermore, the response evaluator 205 evaluates one or more received responses from the one or more user equipments 101. These one or more responses are compared with the one or more databases 203. The received one or more responses and/or data from the one or more responses may be stored at storage 207 for further and/or later processing.

In an example embodiment, multi-party CAPTCHA, is a puzzle that requires two or more users to cooperate in order to solve the puzzle. Server 200 generates a challenge and splits it up into at least two components. The server 200 sends each component to a different user and provides a communication channel, such as a secure voice, data, or video stream, between users so that they can collaboratively answer the challenge. Users may solve the CAPTCHA by typing an answer into a text field, or users may be presented with a set of images, audio, animations or videos, and be asked to select the picture, audio file, animation or video that represents their responses.

In order to be secure from bots, the challenge generated should be one that is difficult for computers to parse. For example, voice may be used because speech recognition systems have difficulty with short phrases when there are an unlimited number of possible responses and the system is not trained for the speaker's linguistic idiosyncrasies. Additionally, the server 200 may provide mechanisms for a user to flag their partner as a non-human entity. For example, the user interface may provide a button to identify the partner as a computer program. In this way, users of the server may help identify bots that are using the system.

Figure 3:
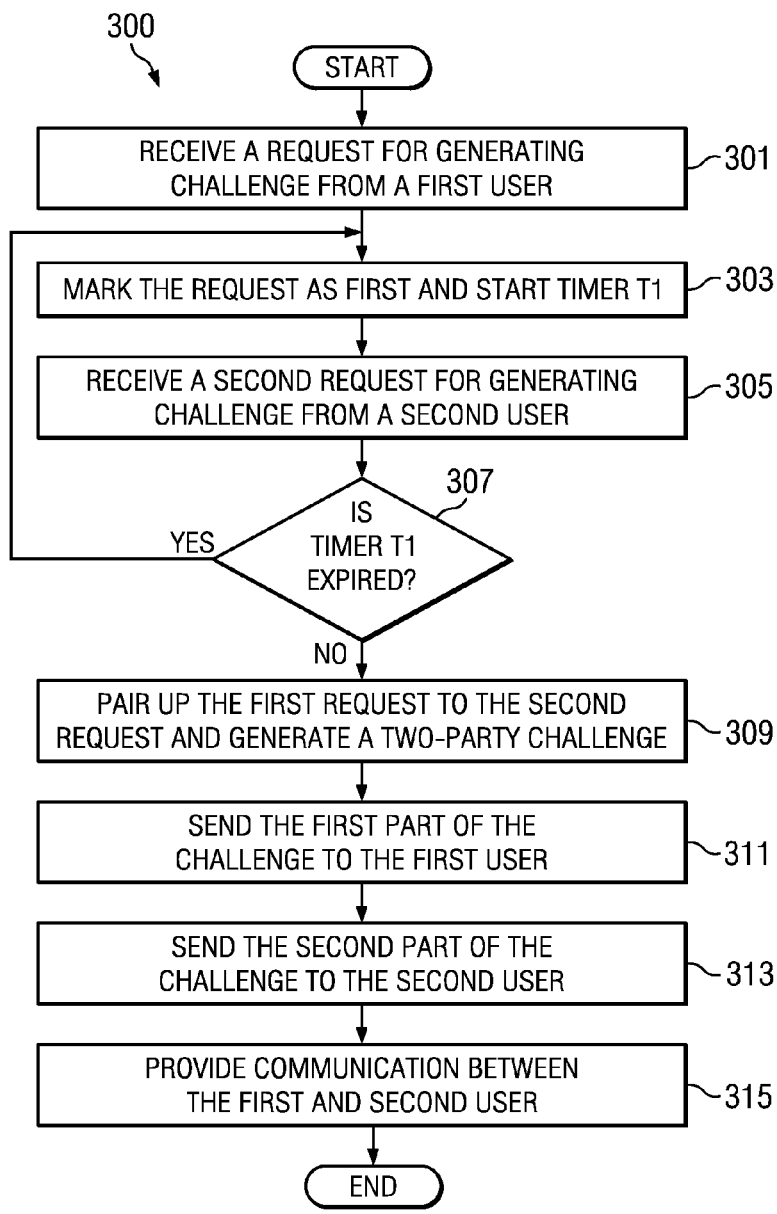
FIG. 3 depicts an example process for verification of users in accordance with an example embodiment of the invention.

FIG. 3 depicts an example process for verification of users in accordance with an example embodiment of the invention. In an example embodiment, FIG. 3 depicts an example process for receiving a request and generating one or more CAPTCHA challenges for verification of the users in accordance with an example embodiment of the invention. At block 301, the server, for example server 200 of FIG. 2, receives a request for generating a new challenge of a first user from a first web server. At block 303, the server marks this first request as "pending" and waits for the challenge of a second user so that the server can pair up the first and the second request. To avoid a long wait for the first user, the server may set up a timer T1, The server starts a timer t1 and wait for a second request. If the timer t1 expires before the arrival of the second request, a single-party alternative may be used. In the single-party alternative, the first user is paired with a simulated user so that the first user can be verified. The server may simulate the second user and pairs with the first user.

At block 305, the server receives a request for a new challenge for a second user from the first or a second web server. At block 307, the server checks to see if the timer t1 is active or not. If the timer is already expired, there is no longer a first request pending. The first request may be already paired with a simulated user after a long wait. The second request goes back to block 303, marks itself as the first request, starts a new timer t1 and waits for the second user request to pair with.

At block 309, if the timer t1 is not yet expired, the server pairs the first request to the second request and generates a two-component CAPTCHA challenge. The CAPTCHA challenge may include an image of a text string, as well as a voice over internet protocol, VoIP, or video stream between the server and the web servers.

At block 311, the server sends the first component of the challenge to the first web server, for example web server 109 of FIG. 1. The first web server acts as a proxy and forwards the first component challenge to the first user. At block 313, the server sends the second component of the two-component challenge to the second web server. The second web server acts as a proxy and forwards the challenge to the second user. Note that the first web server and the second web server may be the same server if the first user and second user are accessing the same server. At block 315, the server acts as a proxy to provide the communication between the first user and the second user.

Figure 4:
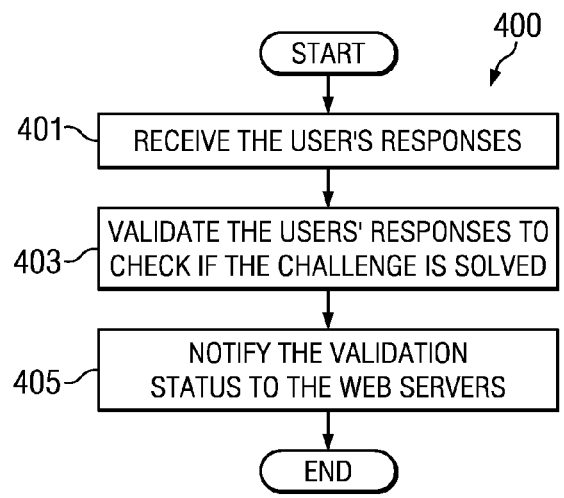
FIG. 4 depicts an example process for receiving the response from a user and determining if the user is able to respond to the completely automated public turing test to tell computers and humans apart, CAPTCHA, test successfully in accordance with an example embodiment of the invention.

In one embodiment of the invention, both users may be expected to enter an identical answer to the challenge. In another embodiment of the invention, each user generates an answer based on the other user's challenge. FIG. 4 depicts an example process for receiving the response from the users and determining if the users pass the CAPTCHA challenge in accordance with an example embodiment of the invention. At block 401, the server, for example server 200 of FIG. 2, receives responses from the users. At block 403, the user's responses are validated. If both users enter the correct answer, then users have solved the CAPTCHA challenge successfully. At block 405, the server notifies the user's web servers, for example web server 109 of FIG. 1, of the validation status.

If the users fail the CAPTCHA challenge, any one of the users may request a new challenge. The server creates a new request and possibly pairs that user to a new partner. Although we have only discussed the multi-party challenges example with respect to two components/users, it applies to more than two components/users.

An embodiment of multi-party challenge may be based on a split phrase. For example, User A receives every odd word in a phrase, and User B receives every even word. Both users are expected to enter the complete phrase. This requires the ability to read the text, understand the spoken remote half, and enter both pieces in a sensible order. Phrases can be culled from any corpus of text, for example, the Oxford English Corpus.

Figure 5A:
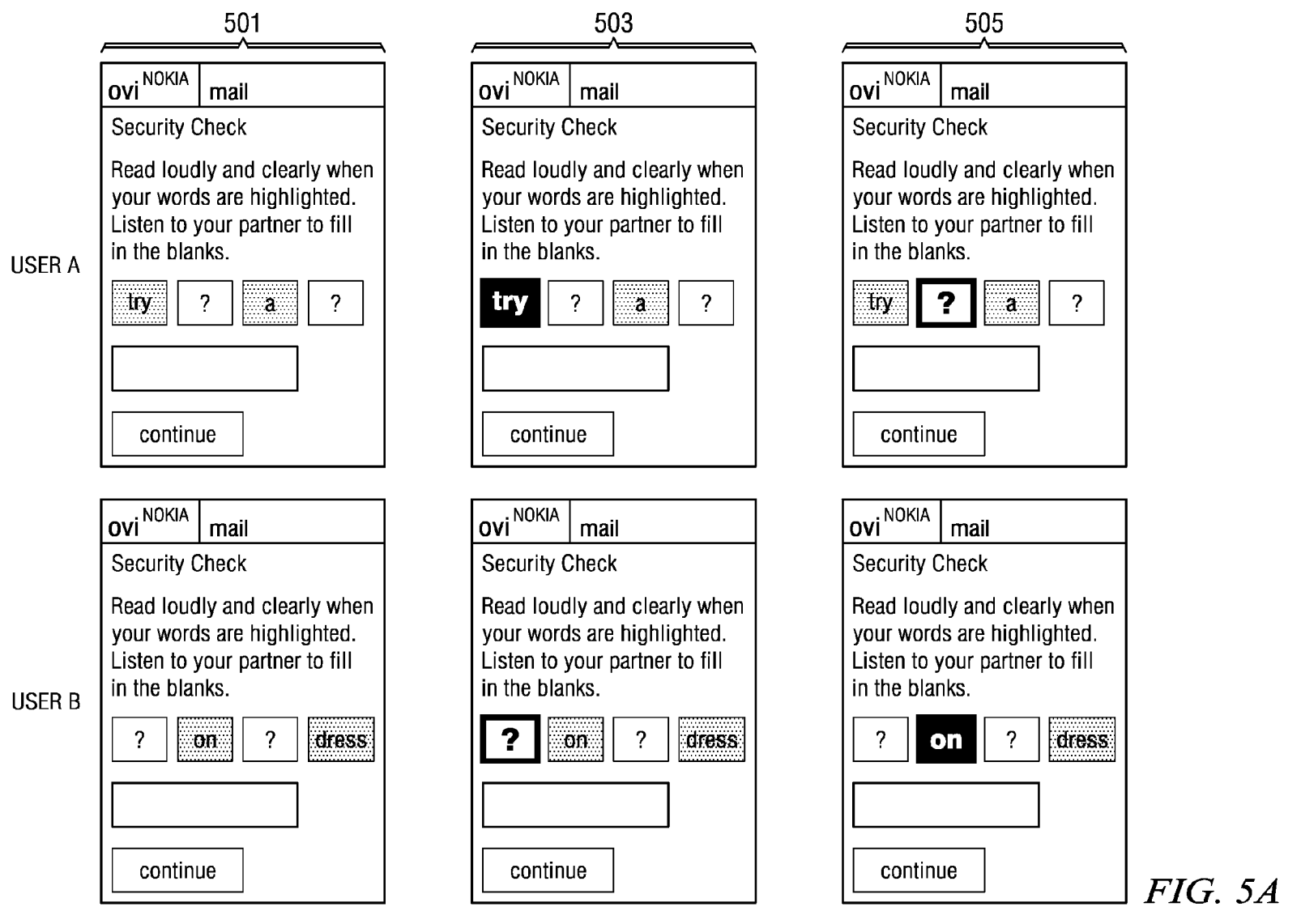
Figure 5B:
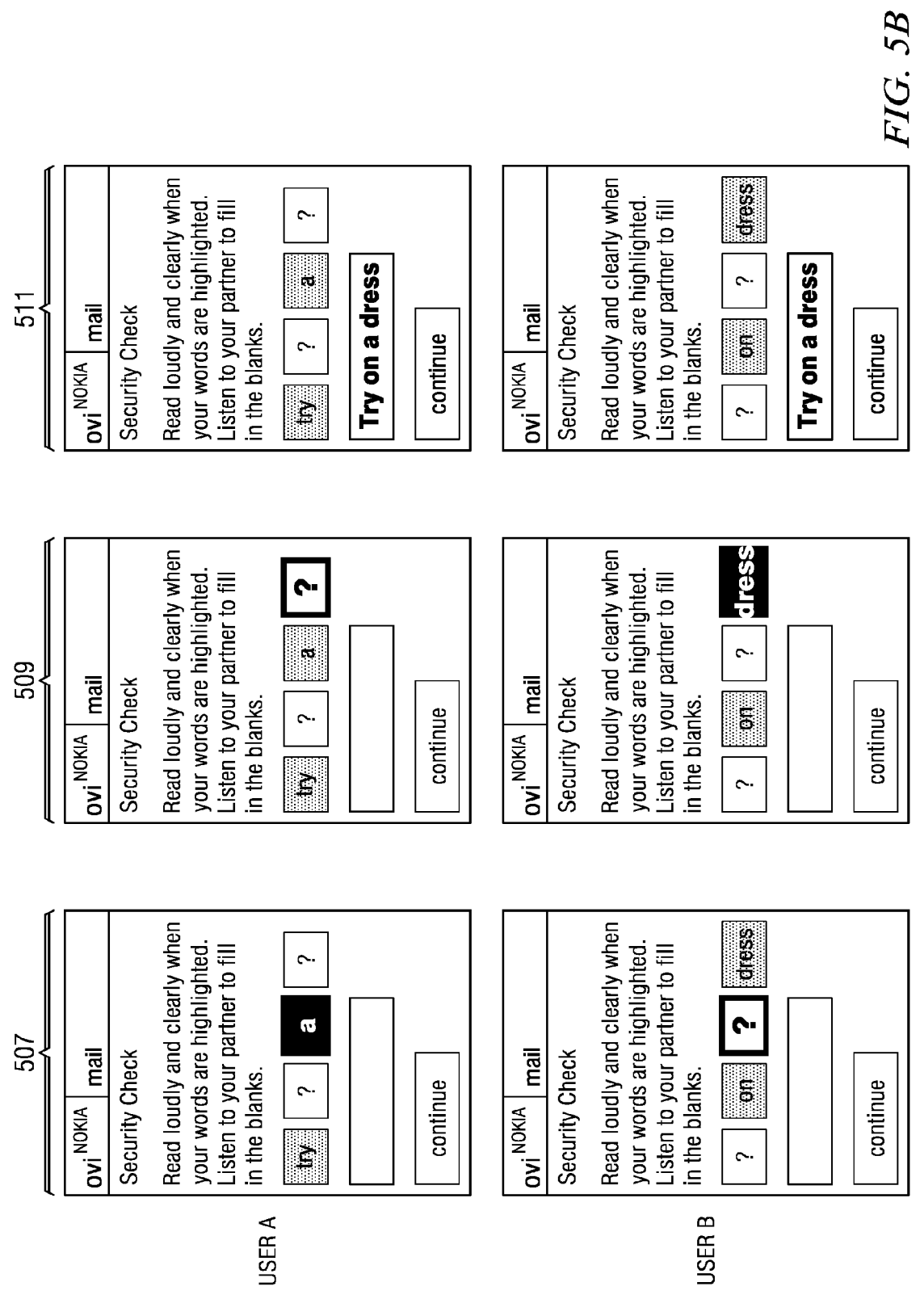

FIG. 5 depicts an example approach of split phrase based on multi-party karaoke in accordance with an example embodiment of the invention. Karaoke is an exercise for the server to display and highlight the words for the users to speak along. The server retrieves a phrase from a text corpus "try on a dress". At block 501, user A receives "try a" and user B receives "on dress" from the server. The server highlights words for users to speak in correct order. At block 503, user A reads "try". At block 505, user B reads "on". At block 507, user A reads "a". At block 509, user B reads "dress". The server can automatically advance through the words by doing speaker-independent speech recognition on each word and then advancing after there is a match. This is possible because the server knows the single word that needs to be recognized.

At block 511, both users then type in the answer "try on a dress". If replies from use A and user B are correct, the server returns success to the web servers. Otherwise, if one or both of the replies from user A and user B are not correct, the server returns failure status to the web servers. Multi-party CAPTCHA relies on the user interaction to verify if the user is human or not. In an example embodiment, even if just one user fails the challenge the validation fails. This example multi-party Karaoke approach would prevent bots from guessing phrases through a search of the corpus since the server can generate phrases from any text corpus.

Another example embodiment of multi-party challenges is a riddle. A riddle requires both reading and common sense reasoning. This makes it harder for computers to solve the riddle. User A asks a riddle "What do you wear on a finger?". User B types in "a ring". User B then asks a second riddle "What is the color of the sky on a clear day?" User A types in "blue". The users may need to read the phrases aloud to each other to solve the challenge. Riddles may be generated using a common sense database, and use synonyms to extend possible riddles and answers.

The server may provide a user interface element for the users to identify partners as non-human. For example, the server may provide a graphical user interface, GUI, button named "my partner is not a human," and this button is presented by the web server. If a user clicks this button, both users will be served with a new multi-party challenge, including a new partner. Furthermore, the partner is flagged as potentially non-human, and any probabilistic evaluation of the user can take this into account.

Figure 6:
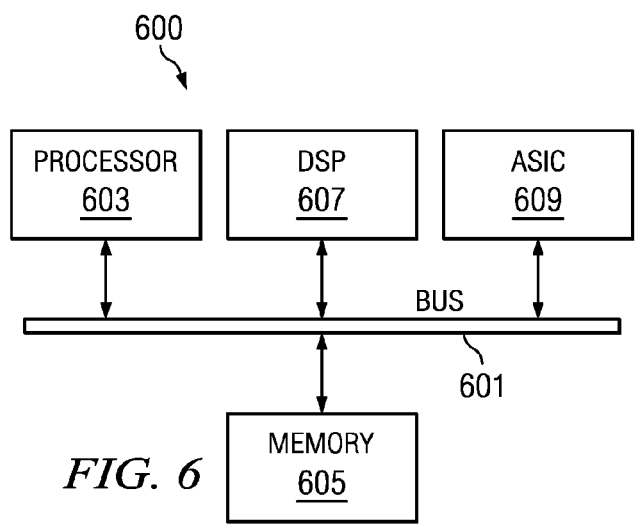
FIG. 6 depicts an apparatus configurable to operate as a server in accordance with an example embodiment of the invention.

FIG. 6 depicts an apparatus configurable to operate as a server in accordance with an example embodiment of the invention. Chip set 600 is programmed to provide CAPTCHA services, for instance, the processor and memory components described with respect to FIG. 2 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of services. Chip set or chip 600, or a portion thereof, constitutes a means for performing one or more steps of providing CAPTCHA services.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors, DSP, 607, or one or more application-specific integrated circuits, ASIC, 609. A DSP 607 typically is configured to process real-world signals, e.g., sound, in real time independently of the processor 603. Similarly, an ASIC 609 can be configured to perform specialized functions not easily performed by a more general-purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide CAPTCHA services. The memory 605 also stores the data associated with or generated by the execution of the inventive steps.

Without in any way limiting the scope, interpretation, or application of the claims appearing below, a technical effect of one or more of the example embodiments disclosed herein is that the speech recognition is a much harder problem for automated software programs when the grammar is unlimited and the system is speaker independent. The multi-party CAPTCHA would force any adversary's system to support an unlimited grammar and be speaker-independent. Another technical effect of one or more of the example embodiments disclosed herein is humans can be very effective at identifying non-humans from humans. Forcing the users to interact with one another would help identify automated software programs. Another technical effect of one or more of the example embodiments disclosed herein is that multi-party CAPTCHA relies on common sense reasoning, which is a well-known, difficult problem for bots to solve.

Embodiments of the present invention may be implemented in software, hardware, application logic or a combination of software, hardware and application logic. The software, application logic and/or hardware may reside on CAPTCHA server, Internet service provider or user equipment. If desired, part of the software, application logic and/or hardware may reside on CAPTCHA server, part of the software, application logic and/or hardware may reside on Internet service provider, and part of the software, application logic and/or hardware may reside on user equipment. In an example embodiment, the application logic, software or an instruction set is maintained on any one of various conventional computer-readable media. In the context of this document, a computer-readable medium may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed:

1. A method comprising:
   receiving at least one request for generating a challenge from at least one device;
   generating the challenge with at least two components;
   transmitting the at least two components of the challenge to the at least one device;
   causing presentation of a component of the at least two components of the challenge to each of at least two users;
   causing communication between said at least two users to answer the challenge using the presented components, wherein in response to the communicating a user generates an answer based a component of the challenge presented to another user of the at least two users; and
   receiving at least two responses to the challenge from the at least one device, wherein each response comprises an answer to a component of the at least two components of the challenge from a user of the at least two users, and wherein the challenge is solved based on the answer to each component of the at least two components of the challenge being correct.

2. The method of claim 1, wherein the challenge comprises at least one of a riddle generated using common sense database, and at least two segments of a phrase.

3. The method of claim 1, wherein the communication between said at least two users comprises at least one of a voice, data, and video stream.

4. The method of claim 1, wherein the at least two components comprises at least one of a set of images, audio, animations and videos.

5. The method of claim 1, wherein at least one of the at least two responses further comprises:
   an indication indicating one of the at least two users is a non-human.

6. The method of claim 1, further comprising:
   validating the responses to determine if the challenge is solved;
   notifying the at least one device if the at least two users are human or non-human.

7. An apparatus, comprising:
   at least one processor; and
   at least one memory including computer program code;
   the at least one memory and the computer program code configured to, with the at least one processor, cause the apparatus to perform at least the following:
   receive at least one request for generating a challenge from at least one device;
   generate the challenge with at least two components;
   transmit the at least two components of the challenge to the at least one device;
   cause presentation of a component of the at least two components of the challenge to each of at least two users;
   cause communication between said at least two users to answer the challenge using the presented components, wherein in response to the communicating a user generates an answer based a component of the challenge presented to another user of the at least two users; and
   receive at least two responses to the challenge from the at least one device, wherein each response comprises an answer to a component of the at least two components of the challenge from a user of the at least two users, and wherein the challenge is solved based on the answer to each component of the at least two components of the challenge being correct.

8. The apparatus of claim 7, wherein the challenge comprises at least one of a riddle generated using common sense database, and at least two segments of a phrase.

9. The apparatus of claim 7, wherein the communication between said at least two users comprises at least one of a voice, data, and video stream.

10. The apparatus of claim 7, wherein the at least two components comprises at least one of a set of images, audio, animations and videos.

11. The apparatus of claim 7, wherein at least one of the at least two responses further comprises:
    an indication indicating one of the at least two users is a non-human.

12. The apparatus of claim 7, wherein the computer program code further configured to cause the apparatus to:
    validate the responses to determine if the challenge is solved;
    notify the at least one device if the at least two users are human or non-human.

13. A computer program product comprising a non-transitory computer-readable medium bearing computer program code embodied therein for use with a computer, the computer program code executed by at least one processor to perform operations comprising:
    receiving at least one request for generating a challenge from at least one device;
    generating the challenge with at least two components;
    transmitting the at least two components of the challenge to the at least one device;
    causing presentation of a component of the at least two components of the challenge to each of at least two users;
    causing communication between said at least two users to answer the challenge using the presented components, wherein in response to the communicating a user generates an answer based a component of the challenge presented to another user of the at least two users; and
    receiving at least two responses to the challenge from the at least one device, wherein each response comprises an answer to a component of the at least two components of the challenge from a user of the at least two users, and wherein the challenge is solved based on the answer to each component of the at least two components of the challenge being correct.

14. The computer program product of claim 13, wherein the challenge comprises at least one of a riddle generated using common sense database, and at least two segments of a phrase.

15. The computer program product of claim 13, wherein in response to the communicating, a user generates an answer based a component of the challenge presented to another user of the at least two users.

16. The computer program product of claim 13, wherein the communication between said at least two users comprises at least one of a voice, data, and video stream.

17. The computer program product of claim 13, wherein at least one of the at least two responses further comprises:
    an indication indicating one of the at least two users is a non-human.

18. The computer program product of claim 13, further comprises:
  validating the responses to determine if the challenge is solved;
  notifying the at least one device if the at least two users are human or non-human.

\* \* \* \* \*